United States Patent
Gupta et al.

(10) Patent No.: US 10,909,545 B2
(45) Date of Patent: Feb. 2, 2021

(54) INTERACTIVE STORE DESIGN INTERFACE BASED SYSTEM

(75) Inventors: Akhil Gupta, Rajasthan (IN); Swaminathan Sekar, Chennai (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1546 days.

(21) Appl. No.: 12/508,994

(22) Filed: Jul. 24, 2009

(65) Prior Publication Data

US 2011/0022946 A1 Jan. 27, 2011

(51) Int. Cl.
*G06Q 30/00* (2012.01)
*G06Q 10/00* (2012.01)
*G06F 16/958* (2019.01)

(52) U.S. Cl.
CPC ........... *G06Q 30/00* (2013.01); *G06F 16/958* (2019.01); *G06Q 10/00* (2013.01)

(58) Field of Classification Search
CPC ....... G06Q 30/00; G06Q 10/00; G06F 16/958
See application file for complete search history.

(56) References Cited

U.S. PATENT DOCUMENTS

| | | | |
|---|---|---|---|
| 5,911,145 A * | 6/1999 | Arora et al. | 715/207 |
| 6,343,275 B1 * | 1/2002 | Wong | 705/26.1 |
| 6,484,149 B1 | 11/2002 | Jammes et al. | |
| 6,556,975 B1 | 4/2003 | Wittsche | |
| 6,611,814 B1 * | 8/2003 | Lee | G06Q 30/02 705/26.1 |
| 6,873,957 B1 * | 3/2005 | Chen et al. | 705/1.1 |
| 7,000,184 B2 * | 2/2006 | Matveyenko et al. | 715/235 |
| 7,178,108 B1 * | 2/2007 | Workman et al. | 715/762 |
| 7,349,949 B1 * | 3/2008 | Connor et al. | 709/217 |
| 7,366,721 B1 * | 4/2008 | Bennett et al. | 711/206 |
| 7,509,340 B2 * | 3/2009 | Fenton et al. | |
| 7,814,426 B2 * | 10/2010 | Huesken et al. | 715/762 |
| 7,996,259 B1 * | 8/2011 | DiStefano, III | 705/14.1 |
| 8,103,546 B1 * | 1/2012 | Des Jardins et al. | 705/14.73 |
| 8,156,141 B1 * | 4/2012 | Shmulevich et al. | 707/770 |
| 8,176,408 B2 * | 5/2012 | Ammerlaan et al. | 715/200 |
| 8,274,529 B1 * | 9/2012 | Butler et al. | 345/619 |
| 8,621,652 B2 * | 12/2013 | Slater, Jr. | 726/28 |
| 2002/0019881 A1 * | 2/2002 | Bokhari et al. | 709/246 |
| 2002/0038384 A1 * | 3/2002 | Khan et al. | 709/245 |
| 2002/0059073 A1 * | 5/2002 | Zondervan et al. | 704/270.1 |

(Continued)

OTHER PUBLICATIONS

Fitzgerald, W., "Models for Cross-Cultural Communications for Cross-Cultural Website Design", Apr. 6, 2004, pp. 1-14.*

(Continued)

*Primary Examiner* — Tuyetlien T Tran
(74) *Attorney, Agent, or Firm* — Potomac Law Group, PLLC

(57) ABSTRACT

An apparatus is provided to configure an online shopping portal that includes a plurality of site. The apparatus receives a request to configure a site of the online shopping portal. The apparatus provides a user interface (UI) shell that corresponds to the site. The apparatus provides an option to select a page of the site to configure. Based on the selected page, the UI shell comprises at least one placeholder and at least one UI content. The apparatus provides a selection mechanism configured to select the at least one UI content to be placed in the at least one placeholder.

20 Claims, 15 Drawing Sheets

(56) References Cited

U.S. PATENT DOCUMENTS

| | | | |
|---|---|---|---|
| 2002/0065851 A1* | 5/2002 | Watson et al. | 707/513 |
| 2002/0156678 A1* | 10/2002 | Adams | 705/14 |
| 2002/0194267 A1* | 12/2002 | Flesner et al. | 709/203 |
| 2003/0056025 A1* | 3/2003 | Moses et al. | 709/316 |
| 2003/0120550 A1* | 6/2003 | Peyrelevade et al. | 705/26 |
| 2003/0120599 A1* | 6/2003 | Agboatwalla et al. | 705/50 |
| 2004/0123238 A1* | 6/2004 | Hefetz et al. | 715/513 |
| 2004/0230897 A1* | 11/2004 | Latzel | 715/513 |
| 2005/0080669 A1* | 4/2005 | Zhang | 705/14 |
| 2005/0144093 A1 | 6/2005 | Kassan | |
| 2005/0149549 A1* | 7/2005 | Jaspers et al. | 707/102 |
| 2005/0246627 A1* | 11/2005 | Sayed | 715/513 |
| 2005/0251409 A1* | 11/2005 | Johnson et al. | 705/1 |
| 2005/0267789 A1* | 12/2005 | Satyadas et al. | 705/7 |
| 2006/0036954 A1* | 2/2006 | Satyadas et al. | 715/742 |
| 2006/0212822 A1* | 9/2006 | Facemire et al. | 715/769 |
| 2007/0074108 A1* | 3/2007 | Xie et al. | 715/517 |
| 2007/0162846 A1* | 7/2007 | Cave et al. | 715/530 |
| 2007/0277091 A1* | 11/2007 | Torigoe et al. | 715/511 |
| 2008/0172608 A1* | 7/2008 | Patrawala et al. | 715/255 |
| 2008/0178122 A1* | 7/2008 | Besecker | 715/854 |
| 2009/0043674 A1* | 2/2009 | Minsky | G06Q 30/0603 705/26.8 |
| 2009/0177959 A1* | 7/2009 | Chakrabarti et al. | 715/234 |
| 2009/0222416 A1* | 9/2009 | Tymoshenko et al. | 707/3 |
| 2010/0251095 A1* | 9/2010 | Juvet et al. | 715/234 |
| 2010/0251143 A1* | 9/2010 | Thomas et al. | 715/760 |
| 2011/0029879 A1* | 2/2011 | Calvin | 715/733 |

OTHER PUBLICATIONS

Pyles, J. et al., "SharePoint 2007: The Definitive Guide", Sep. 2007, O'Reilly Media, 1-74.*

Pyles, J. et al., "SharePoint 2007: The Definitive Guide", Sep. 2007, O'Reilly Media, Chapters 5, 9, and 23 (Year: 2007).*

Screenshots; AmeriCommerce Shopping Cart Software; http://www.americommerce.com/Screenshots.htm?contentonly=true#ThemeManagement; downloaded on Jan. 27, 2009; pp. 1-12.

About.com Web Design/HTML; "Free Web Template: Two Column Layout With Header and Footer"; http://webdesign.about.com/od/freewebtemplates/a/bl2colheadfootx.htm; Aug. 29, 2004; pp. 1-2.

* cited by examiner

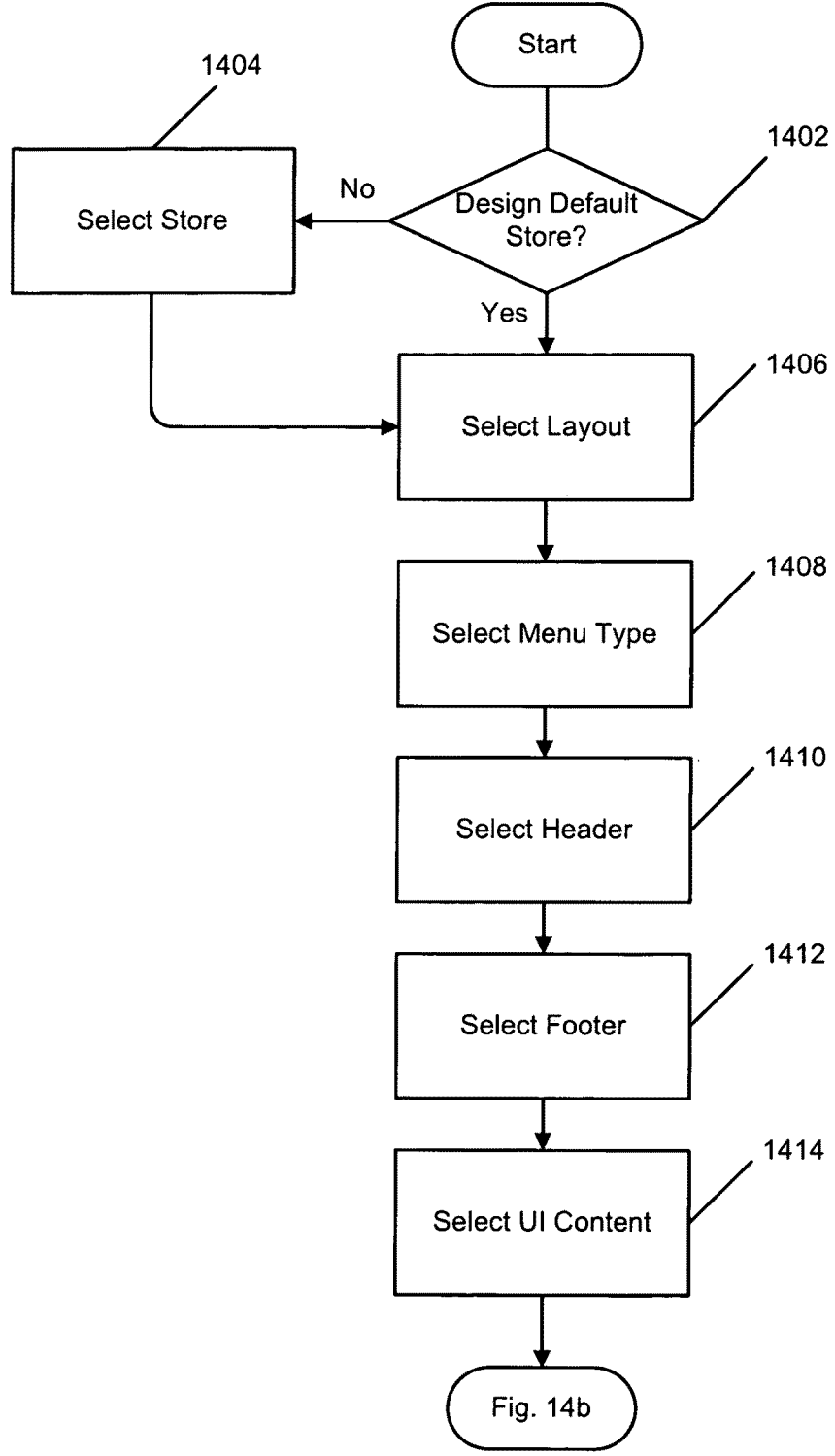

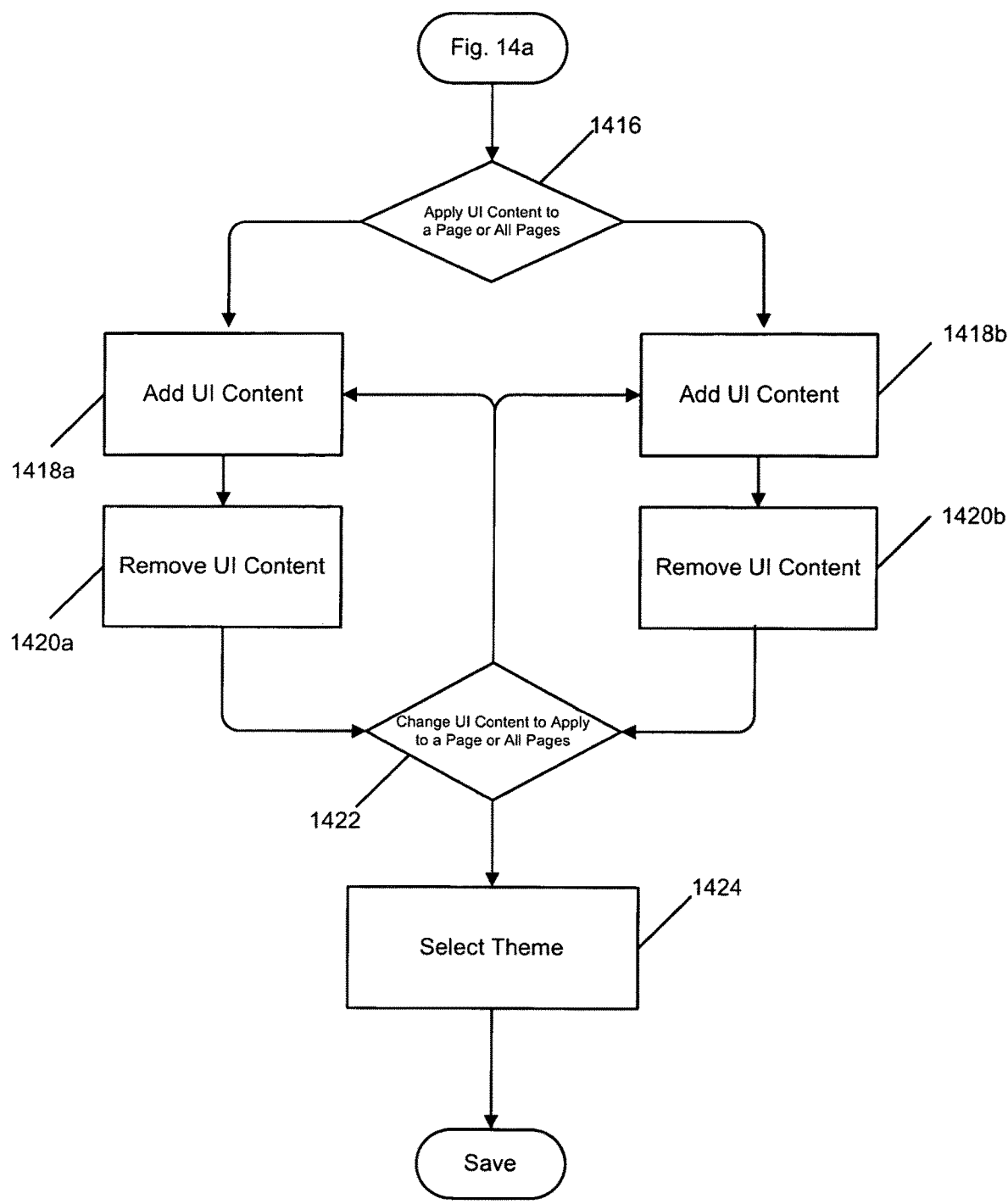

INTERACTIVE STORE DESIGN INTERFACE BASED SYSTEM

FIELD

One embodiment is generally directed to a website, and more particularly, to modifying one or more pages of the website.

BACKGROUND

Generally, when a user views an e-commerce website or "portal", the user can choose which site to access from the portal. The portal may allow the user to choose from a list of the sites based on geography, type of customer, type of business, etc. For example, a business might have a site for specific business customers only. This type of site is called business-to-business ("B2B") site. The business can also have a site for general customers. This type of site is called business-to-customer ("B2C") site. Based on the selected site, each site includes different content, a different arrangement of content, different header and/or footer, and a different theme.

However, there may be instances where a person with authority, such as an administrator, wants to customize one or more sites of the portal. For example, the administrator of the portal might want to change a layout or shell for the United States site while making different changes to the layout for the India site of the portal. In addition, the administrator might want to add a new site for Japan, which would have a different look and feel as well as different content.

SUMMARY

One embodiment is an apparatus to configure an online shopping portal that includes a plurality of site. The apparatus receives a request to configure a site of the online shopping portal. The apparatus provides a user interface (UI) shell that corresponds to the site. The apparatus provides an option to select a page of the site to configure. Based on the selected page, the UI shell comprises at least one placeholder and at least one UI content. The apparatus provides a selection mechanism configured to select the at least one UI content to be placed in the at least one placeholder.

BRIEF DESCRIPTION OF THE DRAWINGS

FIG. 14*a* and FIG. 14*b* are hierarchical flow diagrams for creation and/or modification of one or more pages of a store to be implemented by an interactive store designer in accordance with some embodiments of the invention.

DETAILED DESCRIPTION

One embodiment is a interactive store design interface that allows an administrator an option to create and/or modify one or more stores of an e-commerce portal. The interface allows the administrator to interactively create and/or modify a layout, a menu type, a header, a footer, content, and a theme of the selected store, thereby eliminating the need to program/code the one or more stores of the portal.

Figure 1:
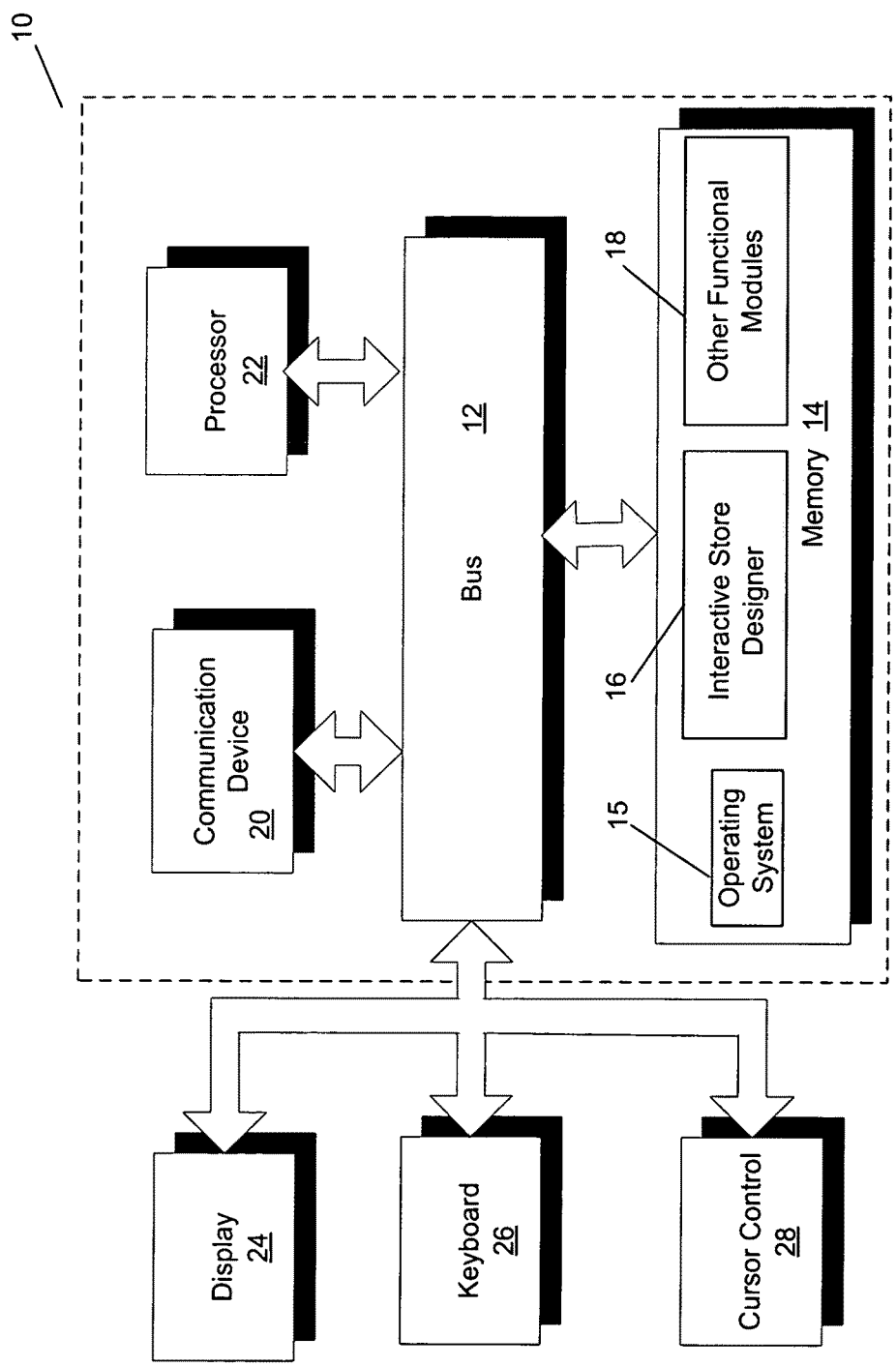
FIG. 1 is a block diagram of an interactive store design interface based system that can be implemented in one embodiment of the invention.

FIG. 1 is a block diagram of an interactive store design interface based system 10 that can be implemented in some embodiments of the invention. System 10 may include a bus 12 or other communication mechanism that can communicate information and a processor 22, coupled to bus 12, that can process information. Processor 22 can be any type of general or specific purpose processor. System 10 may also include a memory 14 that can store information and instructions to be executed by processor 22. Memory 14 can be comprised of any combination of random access memory ("RAM"), read only memory ("ROM"), static storage such as a magnetic or optical disk, or any other type of computer readable medium. System 10 may also include a communication device 20, such as a network interface card, that may provide access to a network. As a result, an administrator may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 can also be coupled via bus 12 to a display 24, such as a Liquid Crystal Display ("LCD"). Display 24 may display information to the administrator, such as purchaser agreement information. A keyboard 26 and a cursor control unit 28, such as a computer mouse, may also be coupled to bus 12 to enable the administrator to interface with system 10.

According to one embodiment, memory 14 may store software modules that may provide functionality when executed by processor 22. The modules can include an operating system 15, an interactive store designer 16, as well as other functional modules 18. Operating system 15 may provide an operating system functionality for system 10. Interactive store designer 16 may create and/or customize sites based on the customer's location/geographical position, business type, and/or target customer, as will be described in more detail below. Because system 10 may be part of a larger system, system 10 may include one or more additional functional modules 18 to include the additional functionality. For example, functional modules 18 may include modules that are part of iStore from Oracle Corporation, which may be integrated with CRM and ERP applications, also from Oracle Corporation.

Figure 2:
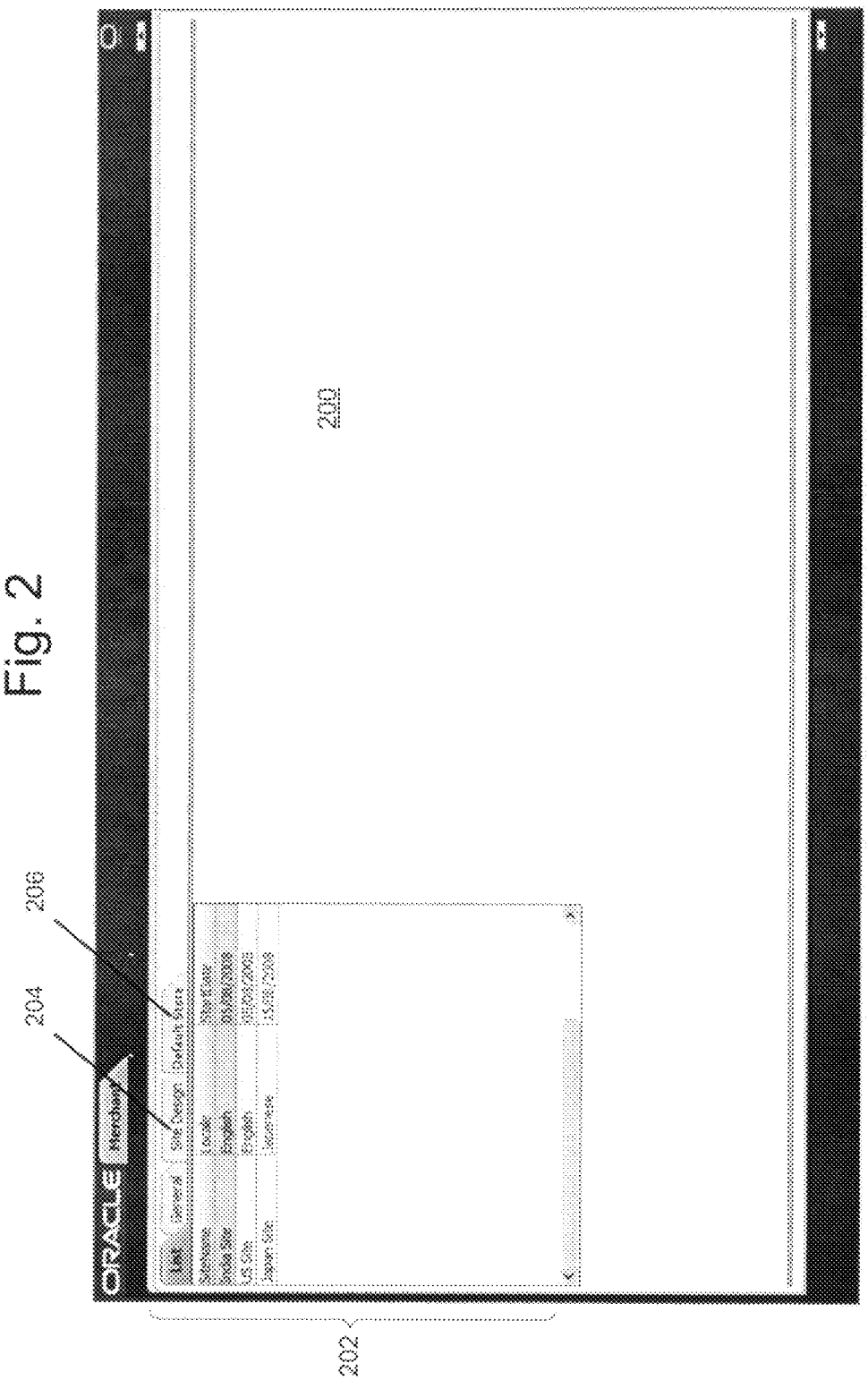
FIG. 2 is a graphical user interface implemented as a part of the interactive store design interface based system that allows an administrator to select, create, and/or design a store of the portal in accordance with some embodiments of the invention.

FIG. 2 is a graphical user interface 200 implemented as a part of the interactive store design interface based system that allows an administrator to select, create, and/or design a store of the portal in accordance with some embodiments of the invention. Graphical user interface 200 provides a list in section 202 of store names for the administrator to select from. For example, section 202 includes an India Site, a United States ("US") Site, a Japan Site, as well as a language that each site is to be displayed in. However, graphical user interface 200 can provide a list in section 202 of store names based on geography, customer type, and/or business type. Graphical user interface 200 includes a "site design" tab 204 so the administrator can design the store of the selected site. Graphical user interface 200 can also include a "default store" tab 206 so the administrator can design a default store. The design of the default store enables all stores, which are subsequently created, to inherit the design of the default store. This reduces the time spent by the administrator to recreate another store with a similar design as an earlier created store.

Figure 3:
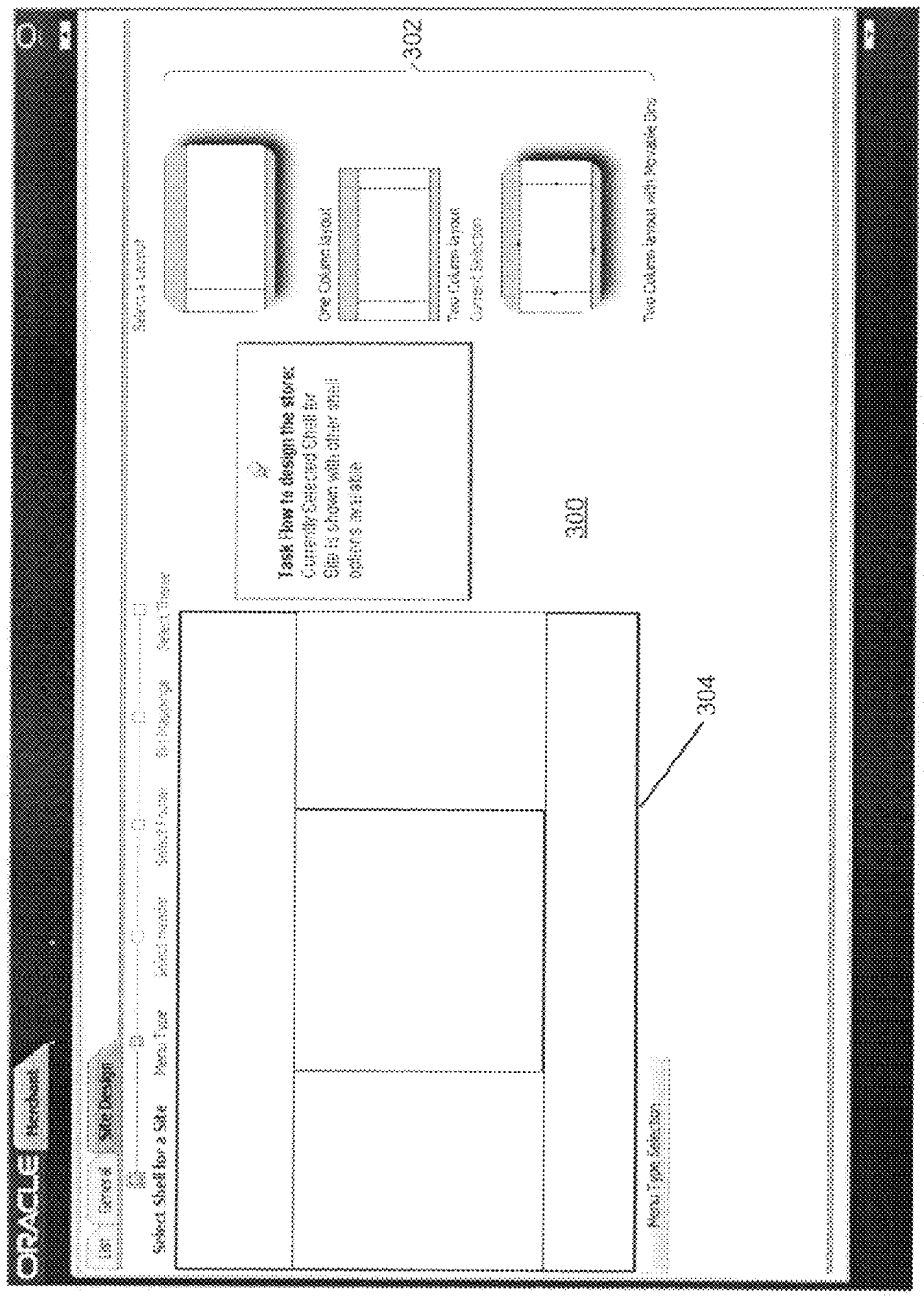
FIG. 3 is a graphical user interface implemented as a part of the interactive store design interface based system that allows an administrator to select a layout to be applicable to a store selected from FIG. 2 in accordance with some embodiments of the invention.

FIG. 3 is a graphical user interface 300 implemented as a part of the interactive store design interface based system that allows an administrator to select a layout to be applicable to a store selected from FIG. 2 in accordance with some embodiments of the invention. Graphical user interface 300 provides a user interface ("UI") shell of the store for the selected site. The UI shell is a page template or layout used to show application pages with a consistent look and feel. For example, graphical user interface 300 provides a component palette in section 302a that can hold a one column, a two column, etc,. Graphical user interface 300 can also be configured to allow the administrator to customize each page with a different template.

Graphical user interface 300 also provides the administrator with a working area or canvas in section 304. The working area allows the administrator to determine which layout is currently being applied or selected. In other words, the working area can serve as a preview for the administrator. Content in the working area will continuously change as the site is being designed.

Furthermore, interactive store designer 16 allows the administrator to add new types of layout components to the already existing layout components in section 302. An XML file can be used to allow the administrator to add new layout components. An example XML file is listed below:

```
<?xml version="1.0" encoding="UTF-8" ?>
- <shellDefs xmlns:xsi="http://www.w3.org/2001/XMLSchema-instance"
  xsi:schemaLocation="http://www.oracle.com/ss
  src/oracle/apps/ss/base/common/pageLayout/ShellSchema.xsd"
  xmlns="http://www.oracle.com/ss">
    - <shell
  name="/ss/base/common/template/TwoColLayout.jspx">
        - <facet name="left">
            <bin name="left1" />
            <bin name="left2" />
        </facet>
        - <facet name="right">
            <bin name="right1" />
            <bin name="right2" />
        </facet>
    </shell>
    - <shell
  name="/ss/base/common/template/OneColumnLayout.jspx">
        - <facet name="right">
            <bin name="right1" />
            <bin name="right2" />
            <bin name="right3" />
        </facet>
    </shell>
    - <shell
  name="/ss/base/common/template/TwoColLayoutMovable.jspx">
        - <facet name="left">
            <bin name="left1" />
            <bin name="left2" />
        </facet>
        - <facet name="right">
            <bin name="right1" />
            <bin name="right2" />
        </facet>
    </shell>
    <!-- newly added layout -->
    - <shell name="/ss/base/common/template/NewShell.jspx">
        - <facet name="newFacet">
            <bin name="placeHolder1" />
            <bin name="placeHolder2" />
            <bin name="placeHolder3" />
        </facet>
    </shell>
</shellDefs>
```

The XML file represents each layout shown on a software as a service ("SaaS") tool, which allows the administrator to add new layouts or shells. In conjunction with UIs discussed below, there can also be similar XML files to add a new menu, a new header, a new footer, one or more new UI content, etc. The use of the SaaS tool by interactive store designer 16 provides the administrator with the ability design a live store where new layouts, menus, headers, footers can be added at runtime.

Figure 4:
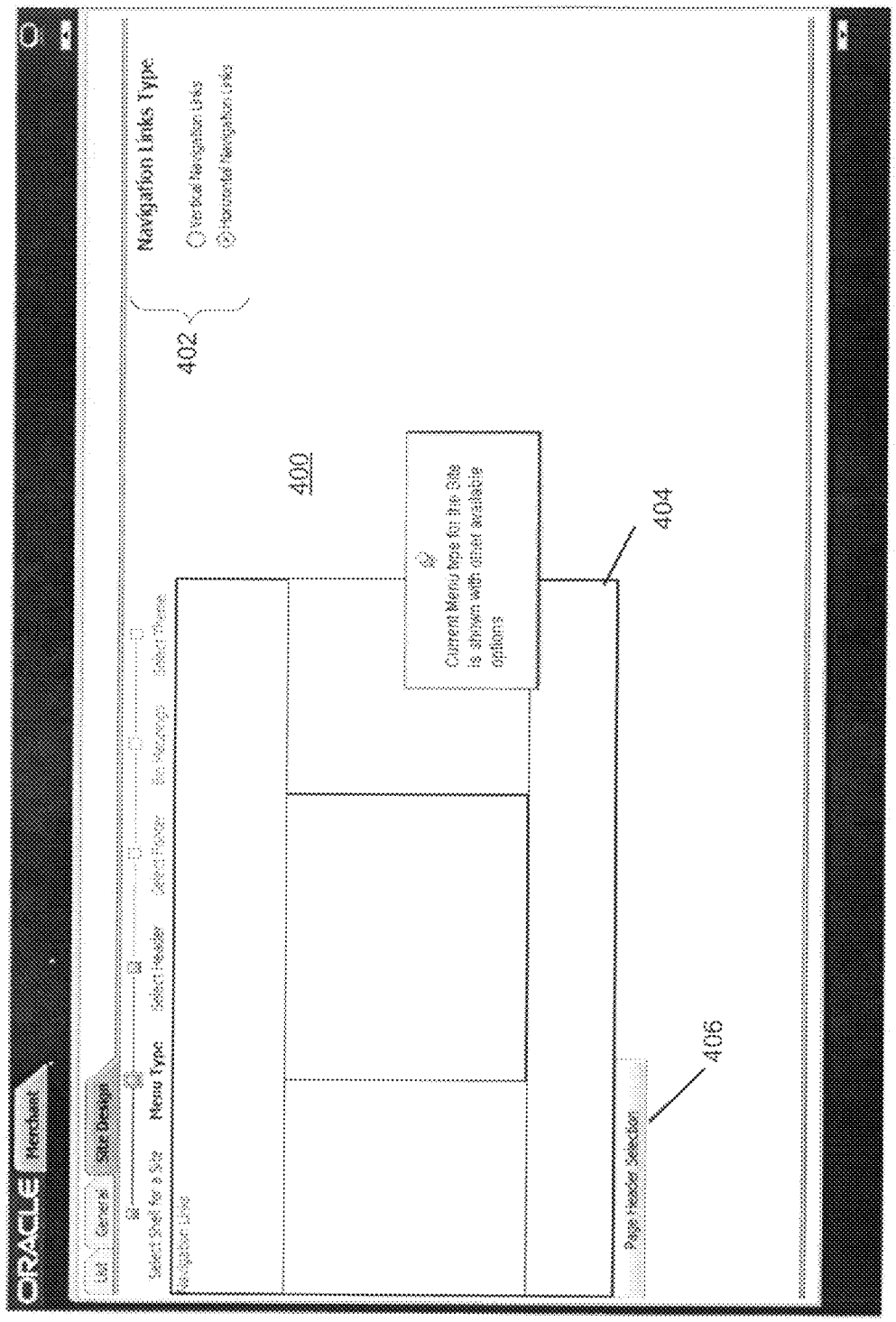
FIG. 4 is a graphical user interface implemented as a part of the interactive store design interface based system that allows an administrator to select a menu type for a store selected from FIG. 2 in accordance with some embodiments of the invention.

FIG. 4 is a graphical user interface 400 implemented as a part of the interactive store design interface based system that allows an administrator to select a menu type for a store selected from FIG. 2 in accordance with some embodiments of the invention. Graphical user interface 400 provides a component palette in section 402 that holds one or more navigational links. The navigational links allow a user of the site to go from one page of the site to another page of the site when the link is selected. These links can be displayed as either vertical navigational links or horizontal navigational links. When the administrator selects vertical navigational links, the vertical navigational links will be shown in a working area in section 404 of the menu type. The administrator can add various other menu types to be included in the component palette in section 402 with the use of the SaaS tool described above. If the administrator is satisfied with the look of the menu type, the administrator can select a "page header selection" button 406 to design a header of the site. However, in another embodiment, the administrator is able to modify header, footer, theme, or content of the site after the menu type selection has been made.

Figure 5:
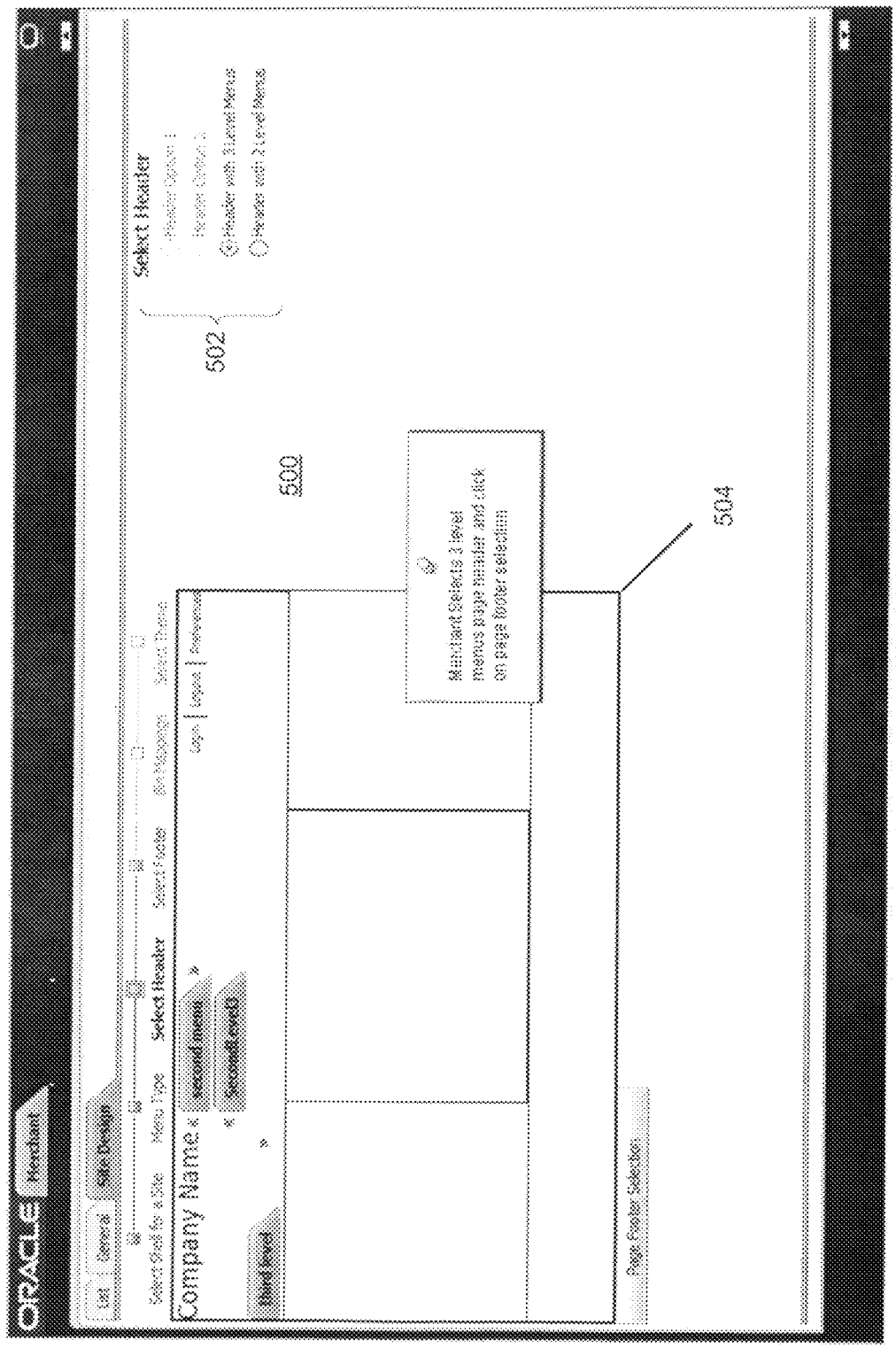
FIG. 5 is a graphical user interface implemented as a part of the interactive store design interface based system that allows an administrator to select a page header for a store selected from FIG. 2 in accordance with some embodiments of the invention.

FIG. 5 is a graphical user interface 500 implemented as a part of the interactive store design interface based system that allows an administrator to select a page header for a store selected from FIG. 2 in accordance with some embodiments of the invention. Graphical user interface 500 provides a component palette in section 502 that holds a list of headers. The list of header choices is dependent on the menu type chosen in FIG. 4. When the header is selected, a preview of the header is provided on a working area in section 504. For example, section 504 shows a header with three level menus with a login link, logout link, preferences link, and a company name.

Figure 6:
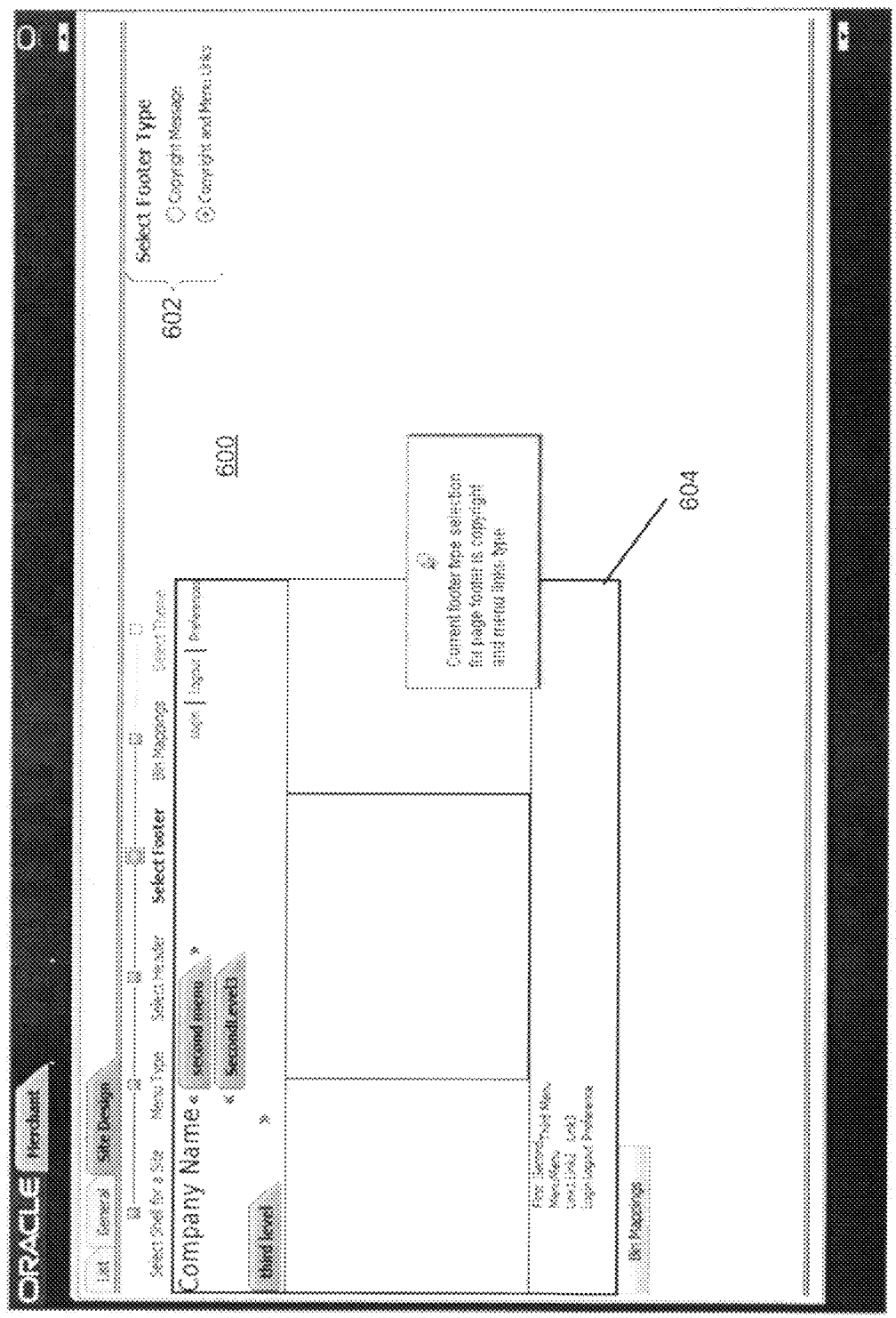
FIG. 6 is a graphical user interface implemented as a part of the interactive store design interface based system that allows an administrator to select a footer to be applied to a store selected from FIG. 2 in accordance with some embodiments of the invention.

FIG. 6 is a graphical user interface 600 implemented as a part of the interactive store design interface based system that allows an administrator to select a footer for a store selected from FIG. 2 in accordance with some embodiments of the invention. Graphical user interface 600 provides the administrator with a component palette in section 602 that holds a list of footer types. The footer type is independent of the menu type that was chosen. The component palette in section 602 includes an option to select a copyright message or copyright and menu links. For example, when the administrator selects the copyright message as the type of footer, a preview in section 604 of the footer is provided for the administrator to view.

Figure 7:
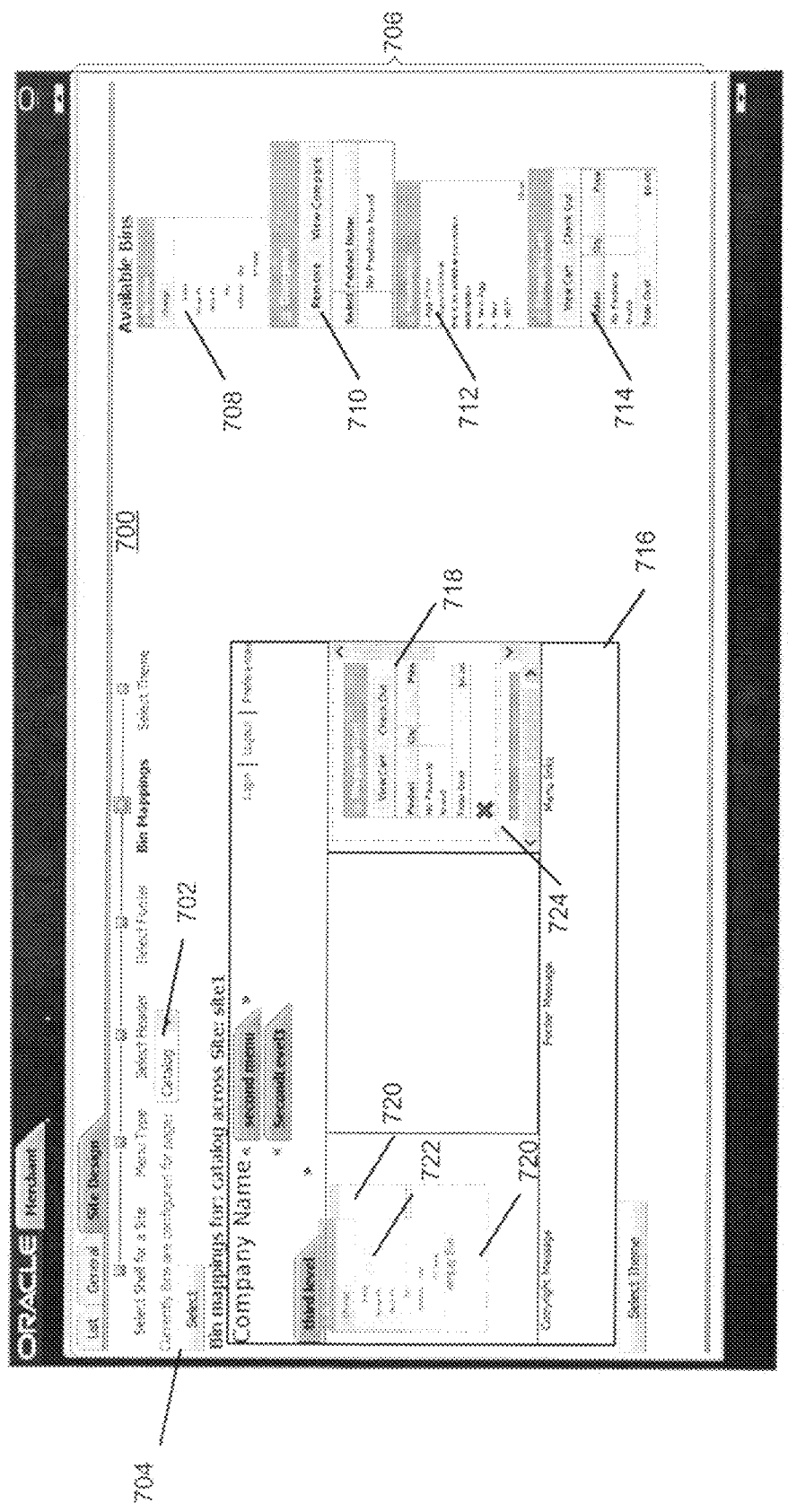
FIG. 7 is a graphical user interface implemented as a part of the interactive store design interface based system that allows an administrator to select content for one or more pages of a store selected from FIG. 2 in accordance with some embodiments of the invention.

FIG. 7 is a graphical user interface 700 implemented as a part of the interactive store design interface based system that allows an administrator to select content for one or more pages of a store selected from FIG. 2 in accordance with some embodiments of the invention. Graphical user interface 700 provides a drop down in field 702 that gives the administrator an option to change what pages the changed content should be applied to. For example, when the same content should be placed on all pages of the store, the administrator can select "all pages" from the drop down in field 702. This "all pages" feature is a content defaulting mechanism for a store. For example, when content, such as "my account" user interface ("UI") content should be included on all pages of the store, the administrator will select "all pages" in the drop down in field 702 and add "my account" UI content to all pages of the store. The feature to add content will be described in more detail below.

However, when, for example, the content should not be applied to "all pages", the administrator can select and change in field 702 the content to be applied to a specific page or pages such as a "catalog page." The administrator can also select and change in field 702 the content to be applied to "order details page", etc. In order to apply the selection, the administrator clicks on the select button at 704.

Based on the page being selected in field 702, graphical user interface 700 provides the administrator with available UI content (also known as "widgets" or "bins") in section 706. The available UI content can be considered to be live content of the "widgets" and/or "bins". Section 706 is a component palette that holds one or more available UI content based on the page being selected in section 702. The one or more available UI content held in the component palette are controlled via a set of repository rules. Using this feature, only UI content with business and/or functional relevance will be available to the user for drag and drop after a page type is selected from the drop down in field 702. Because UI content is segregated based on business and/or custom rules, it makes the task easier for the administrator to add UI content to a particular page because the administrator does not have to wade through a list of UI content to get the required UI content for the particular page.

For example, when the page being selected in field 702 is "catalog page", section 706 includes a "my profile" UI content 708, a "compare" UI content 710, a "promotions" UI content 712, and a "shopping cart" UI content 714. My profile UI content 708 includes information such as name, address, phone number, etc. of a user that is logged in. Compare UI content 710 includes information for the user to compare two or more products listed on a catalog page. Promotions UI content 712 includes "hot offers" related to the currently illustrated product on a product details page. Shopping cart UI content 714 includes products to be purchased by the user, quantity of the products, price of the product, and total cost of the product.

When the page being selected in field 702 is "all pages", section 706 may include a "user profile" UI content and a "contact us" UI content. User profile UI content includes information such as name, address, phone number, etc. of the user. Contact us UI content includes contact information of an owner of the store.

Graphical user interface 700 provides the administrator with a working area or canvas in section 716 of the layout of the page. Section 716 includes place holders 720. Place holders 720 are configured to hold UI content in a certain area of the page, i.e., a left region, a right region, header, footer, etc. As a result, the administrator is able to plug the UI content of section 706 into any place holder 720 on the page of the site using a selection mechanism, such as "drag and drop". For example, the administrator selects my profile UI content 708, drags at 722 to place holder 720, and drops in place holder 720. This drag and drop feature allows the administrator to easily add the UI content without having to modify actual software code for the page or pages, thereby lowering the cost to configure the page of the store.

The working area section 716 also includes the UI content that is currently displayed in section 718 on the page of the store. The working area in section 716 include an "X" button at 724 next to the UI content that is currently displayed in section 718. "X" button at 724 provides the administrator the option to remove the UI content from the page of the store. For example, when the administrator selects "X" button at 724, the shopping cart UI content displayed in section 718 is removed from the page. This will cause the catalog page of the store to remove the shopping cart UI content.

Figure 8:
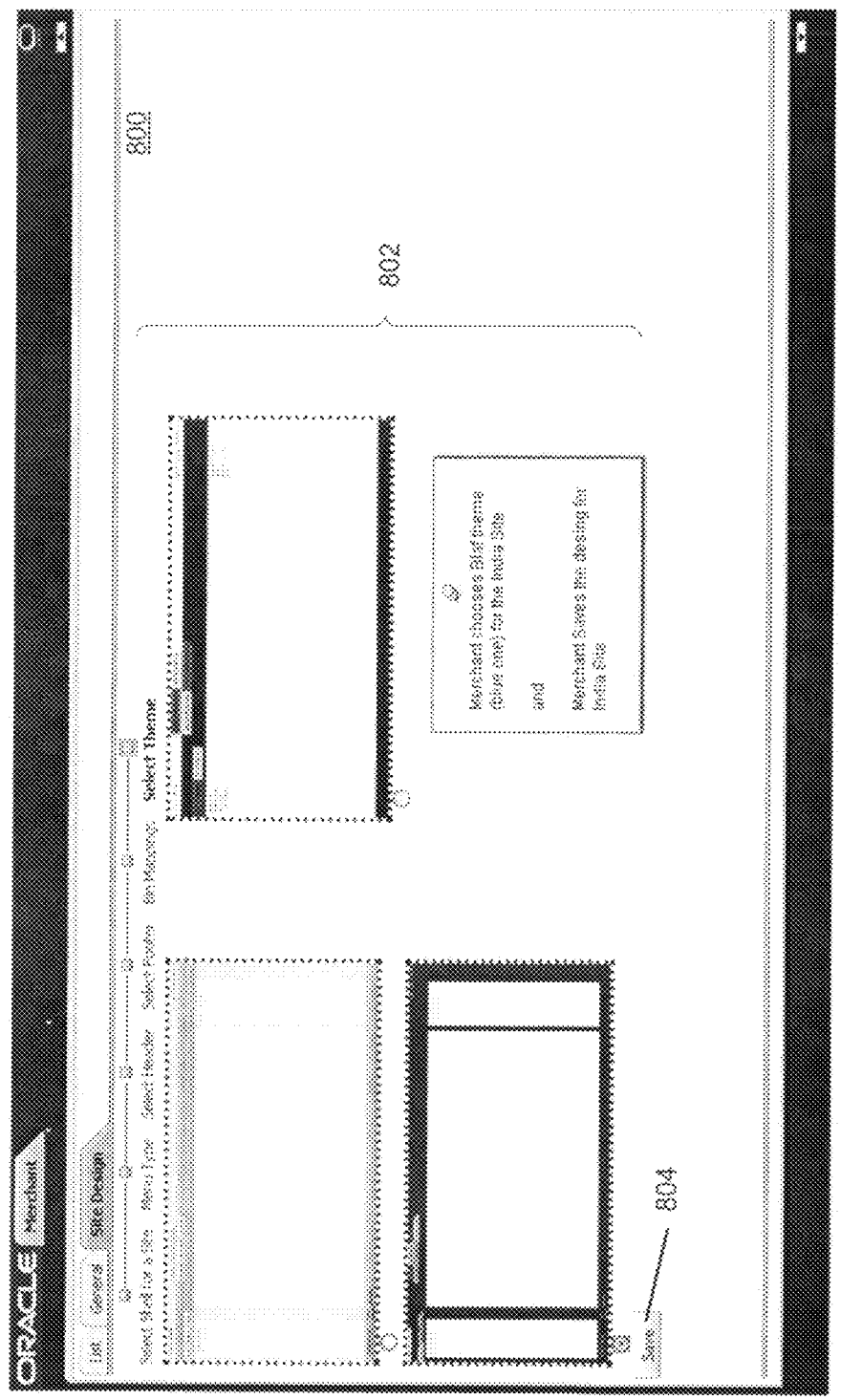
FIG. 8 is a graphical user interface implemented as a part of the interactive store design interface based system that allows an administrator to select a theme to be applied to a store selected from FIG. 2 in accordance with some embodiments of the invention.

FIG. 8 is a graphical user interface 800 implemented as a part of the interactive store design interface based system that allows an administrator to select a theme to be applied to a store selected from FIG. 2 in accordance with some embodiments of the invention. Graphical user interface 800 includes a working area in section 802 of available themes. A theme is a representation of a color, season, holiday, etc. Graphical user interface 800 indicates what theme is currently selected at 804.

Figure 9:
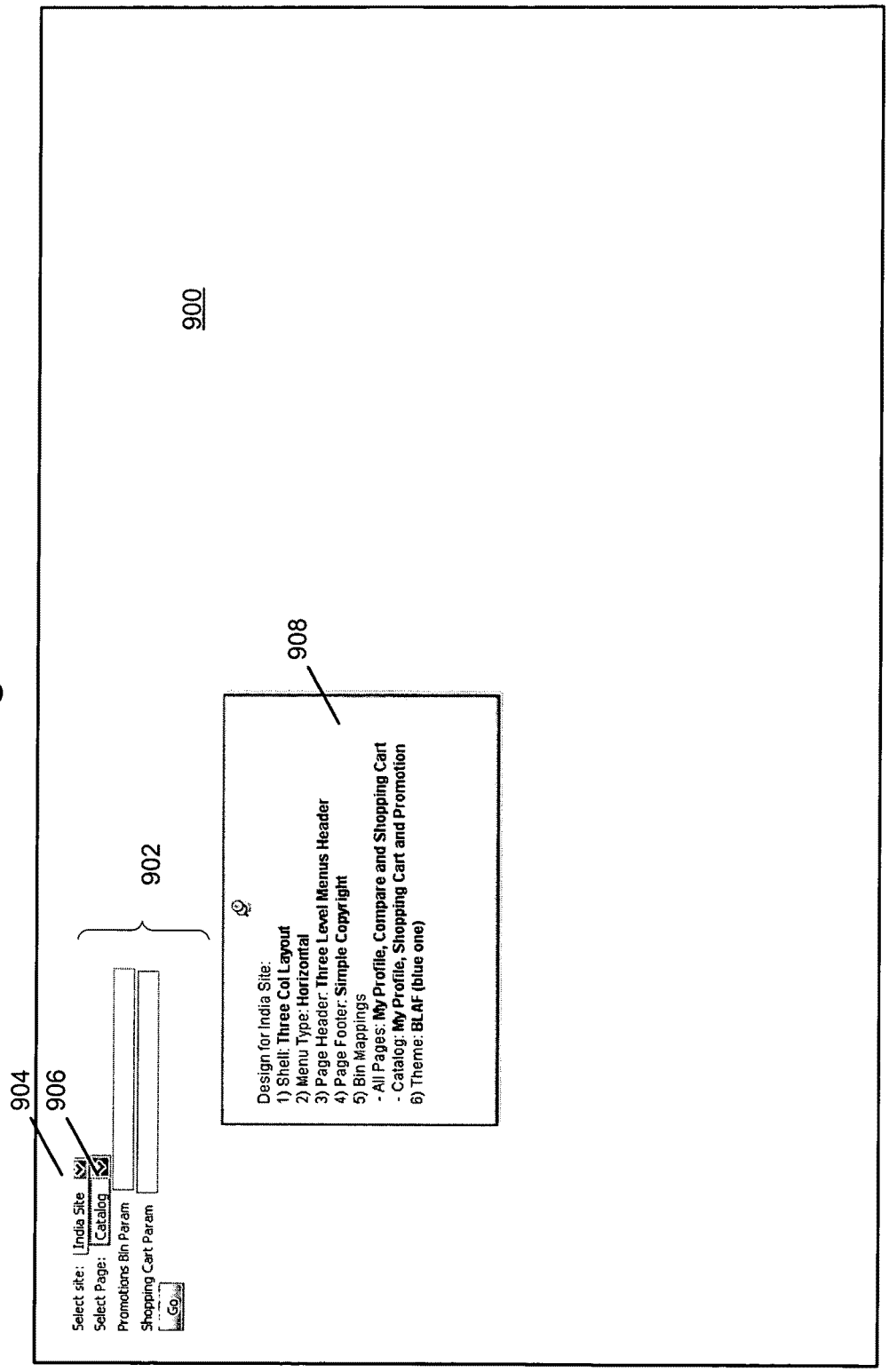
FIG. 9 is a graphical user interface that allows a user to select a site at runtime in accordance with one embodiment of the invention.

FIG. 9 is a graphical user interface 900 that allows a user to select a site at runtime in accordance with an embodiment of the invention. Graphical user interface 900 allows a user to select the site and a page of the site in section 902. For example, when the user wants to access the India site, the user will select the India site from a drop down at 904. The user will also select the page of the site the user wants to access. For example, when the user wants to access a catalog page of the India site, the user will select the catalog page from a drop down at 906. Box 908 provides a summary of all design parameters selected by the administrator via the previously described UI. "Bin Mappings" refers to the selected UI content.

Figure 10:
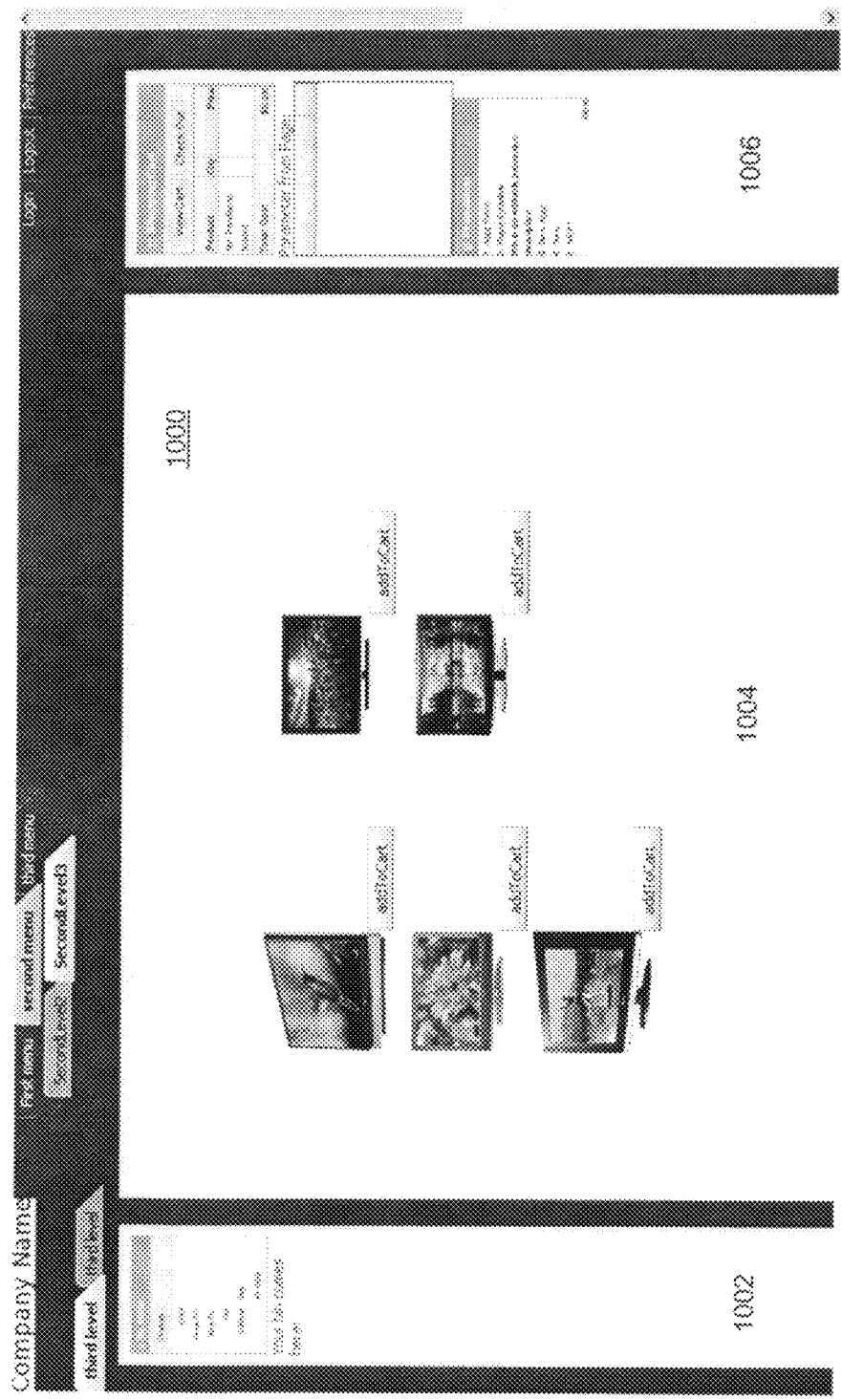
FIG. 10 is a graphical user interface that allows a user to view content of a page of a site that was selected in FIG. 9 in accordance with one embodiment of the invention.

FIG. 10 is a graphical user interface 1000 that allows a user to view content of a page of a site that was selected in FIG. 9 (as summarized in box 908) in accordance with an embodiment of the invention. When the user from India comes to a portal, the user will be forward to the India site. At the India site, graphical user interface 1000 allows the user to view a catalog page of the India site, when the user selects a navigation link related to the catalog page. In this embodiment, when the catalog page is selected, graphical user interface 1000 displays a three column site for the catalog page of the India site. For example, my profile UI content is displayed in a left column 1002, one or more product UI content is displayed in a center column 1004, and a shopping cart UI content and a promotions UI content is displayed in a right column 1006. Graphical user interface 1000 also displays a header with a three level horizontal menu. In particular, each level in the header provides menu selection tabs that are displayed horizontally.

Figure 11:
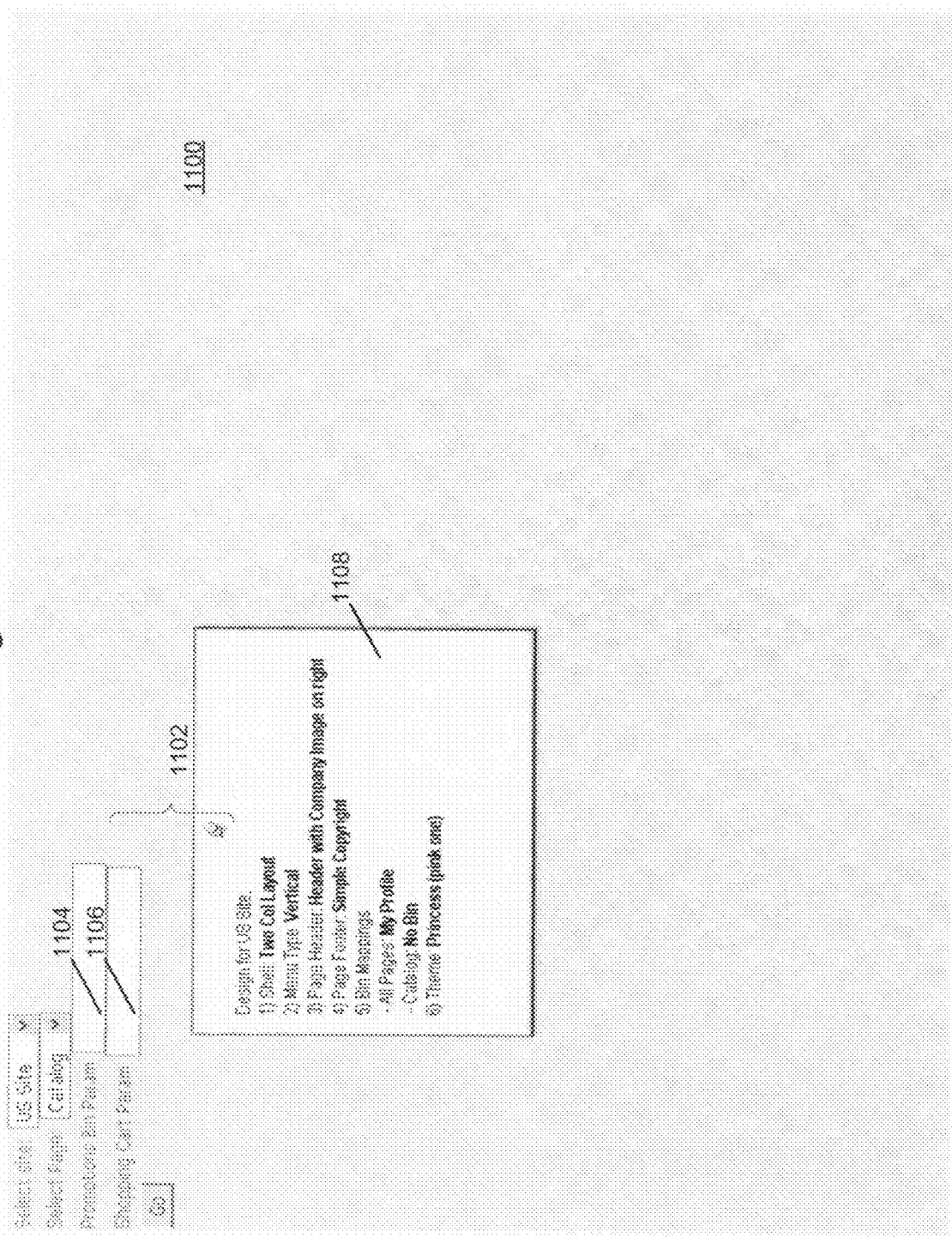
FIG. 11 is a graphical user interface that allows a user to select a site at runtime in accordance with another embodiment of the invention.

FIG. 11 is a graphical user interface 1100 that allows a user to select a site at runtime in accordance with another embodiment of the invention. Graphical user interface 1100 allows a user to select the site and a page of the site in section 1102. For example, when the user wants to access a United States (US) site, the user will select the US site from a drop down 1104. The user will also select the page of the site the user wants to access. For example, the user can select a catalog page as the page of the US site the user wants to access from a drop down 1106. Box 1108 provides a summary of the page.

Figure 12:
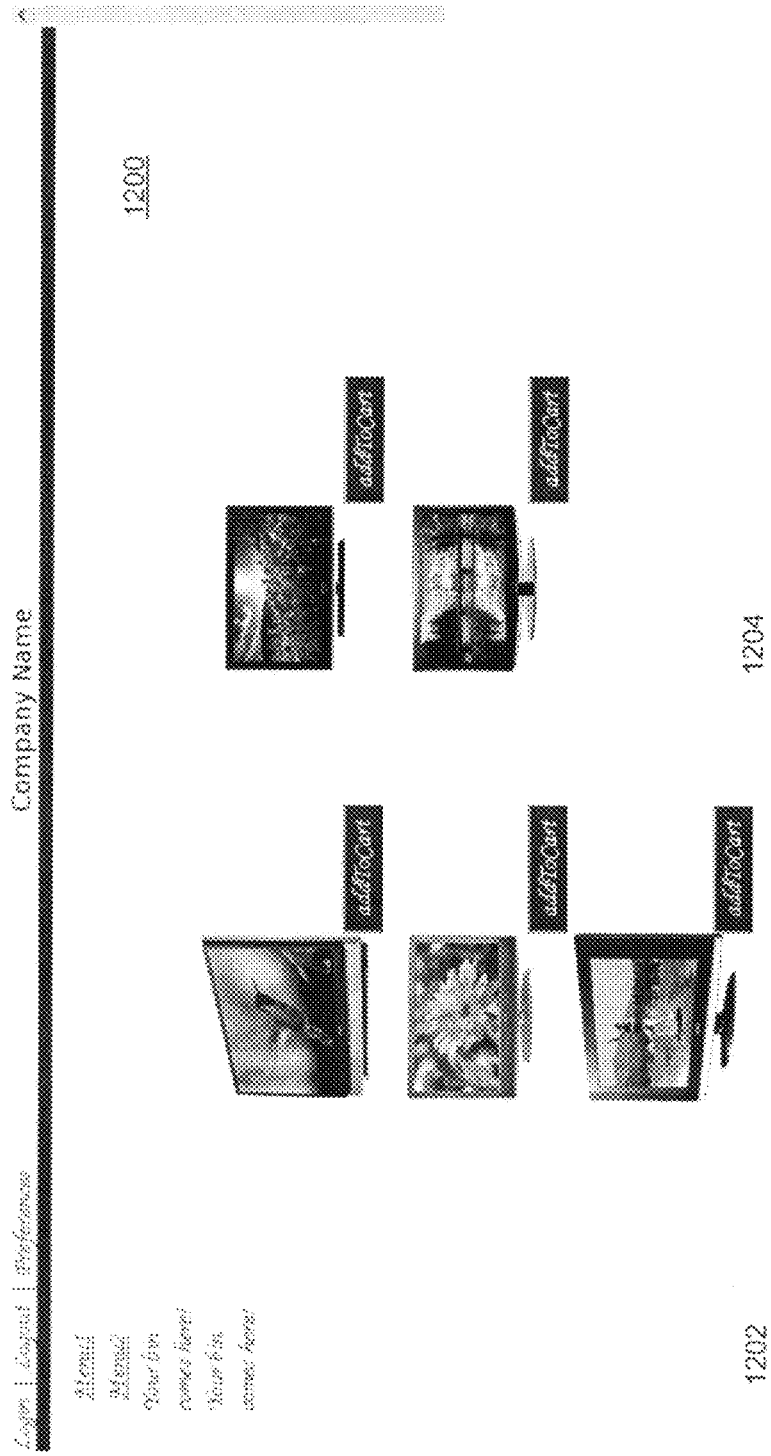
FIG. 12 is a graphical user interface that allows a user to view content of a page of a site that was selected in FIG. 10 in accordance with another embodiment of the invention.

FIG. 12 is a graphical user interface 1200 that allows a user to view content of a page of a site that was selected in FIG. 10 (as summarized in box 1108) in accordance with another embodiment of the invention. At the US site, when the user selects a navigation link related to the catalog page, graphical user interface 1200 allows the user to view a catalog page of the US site. In this embodiment, graphical user interface 1200 displays a two column site for the catalog page of the US site. For example, one or more navigation links, such as catalog, shopping cart, etc., and one or more UI content are displayed vertically in a left column 1202. However, products are displayed in a right column 1204 of the catalog page.

Figure 13:
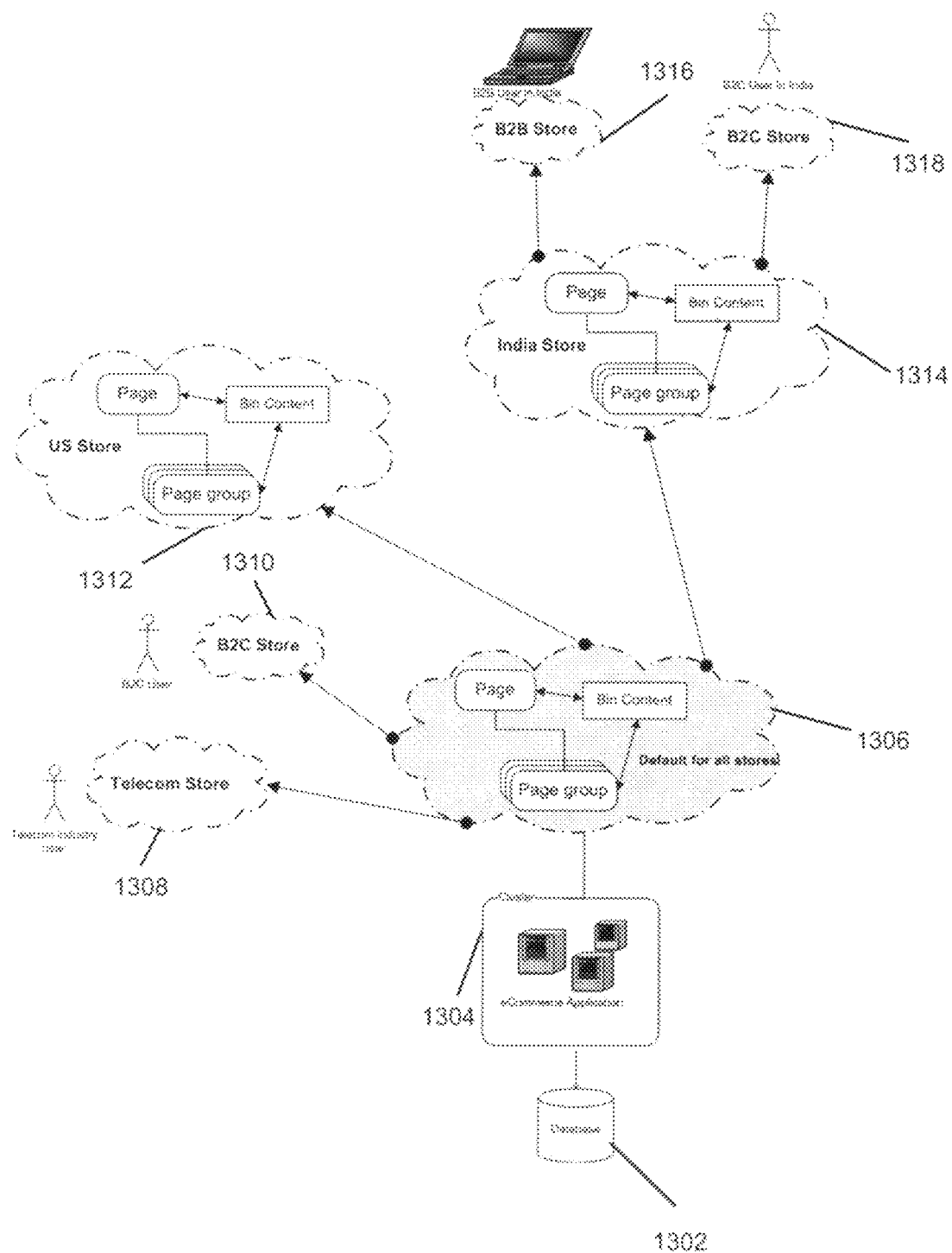
FIG. 13 is a block diagram of an overall architecture of an interactive store design interface based system that can be implemented in another embodiment of the invention.

FIG. 13 is a block diagram of an overall architecture of an interactive store design interface based system 1300 that can be implemented in accordance with another embodiment of the invention. System 1300 includes a database 1302 that stores a cluster 1304 of e-commerce applications or portals. An e-commerce application 1304, which can be hosted at a customer's location or any other location, as a SaaS application, has a default store 1306 design. Default store 1306, which is created by an administrator, can be defined to include default content for all pages or a single page of a store. Default store 1306 will also include a default UI shell, header, footer, and theme for subsequently created or modified stores.

The creation of default store 1306 allows the administrator to quickly create additional stores based on a design of default store 1306. For example, a telecom store 1308, a B2C store 1310, a United States (US) store 1312, and an India store 1314 can all be created based on the design of default store 1306. Furthermore, a B2B store 1316, and a B2C store 1318 can be created based on the design of India store 1314. While each store in system 1300 can inherit the design of default store 1306, the administrator can create and customize each store in a manner that is suitable to the administrators wants and needs. For example, US Store 1312 can have a Thanksgiving theme, whereas India Store 1314 can have a Diwali theme. Therefore, each store in system 1300 is not limited to the design of default store 1306.

In addition, each store in system 1300 includes one or more pages. For example, each store can include an order details page, a catalog page, a product details page, etc. The order details page shows details of products, quantity of product, etc. for a particular order. The catalog page or product list page shows a list of products for a particular product, i.e., TV, laptops, etc. The products detail page shows details of a particular product. Because system 1300 is a hierarchical system, each page of US store 1312 and each page of India store 1314 can be configured to display a different layout, menu, header, footer, and/or UI content.

Furthermore, other than main content being in a central region of a page, each page of the store can include UI content in a form of widgets and/or bins that provides alternate actions and/or paths to related features. For example, the order details page can include UI content related to shipping details and service request. The catalog page includes UI content related to narrow by, compare, and a price range. The products details page includes UI content related to related items, hot offers, cross sells (e.g., which items can be bought for a minimum price if you purchase the product shown on product details page). Therefore, system 1300 allows the administrator to add or remove UI content based on the page of the store.

System 1300 also allows the administrator to add or remove UI content across all pages of the store. For example, the UI content related to user profile information and contact us information can be added or removed across all pages of the store. This provides ease of configurability of common UI content that needs to show up on one or more pages of the store. In other words, system 1300 provides a hierarchical system such that any modifications made to store 1306 can affect other stores. By designing default store 1306, the need of doing the same work again is eliminated when the same set of designs is required to create additional stores. The hierarchical configuration in system 1300 also allows each store under store 1306 to be modified independently and separately such that each store is not affected by the defaults set in store 1306.

FIGS. 14a and 14b are hierarchical flow diagrams of a creation and/or modification of one or more stores to be implemented by interactive store designer 16 in accordance with some embodiments of the invention. In one embodiment, the functionality of the flow diagrams of FIGS. 14a and 14b, is implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1402, an administrator is provided with an option to design a default store or a particular store. If the administrator desires to design the particular store, the administrator is provided with a list of particular stores to select from. Once the administrator selects at 1404 the particular store to design, the administrator is provided with a layout that will be applicable to all pages of the particular store or provided with an option to choose a layout for every page of the store. If the administrator selects to design a default store, the administrator is provided with a layout that will be applicable to all pages of the store.

In either instance, the administrator is provided the option to select a layout/shell at 1406. Similarly, the administrator will be provided with a graphical user interface that enables the administrator to select a layout for a particular page by selecting the page type from a drop down menu. When the administrator selects to design the menu type at 1408, the administrator will be provided with available menu types to select from. For example, the administrator can select a menu type to display either vertical navigational links or horizontal navigational links.

Once the administrator selects the menu type, the administrator can select at 1410 to design a header of the store. The administrator can also select at 1412 to design the footer of the store. Once the footer of the store is selected, the administrator can design the content of the store by selecting at 1414 a bin mappings button, as illustrated in FIG. 7.

The administrator is provided with an option at 1416 to apply UI content configurations to all pages of the store or a specific page of the store. For example, when the administrator selects to apply UI content configuration to a catalog page of the store, as illustrated in FIG. 7, any UI content added at 1418*a* or removed at 1420*a* affects the catalog page of the store. However, when the administrator selects to apply UI content configurations to all pages of the store, any UI content added at 1418*b* or removed at 1420*b* affects all pages of the store.

Once the administrator is satisfied with the changes to the page of the store, the administrator is presented with an option at 1422 to change the page of the store to which modifications are being made. For example, if UI content to be added or removed is currently set to "all pages", the administrator can select a new page type and perform UI content configuration for the newly selected page type.

When the administrator is satisfied with the UI content being applied to the pages of the store, the administrator can select at 1424 a theme to be applied by the store. Once the administrator selects the theme applied to the store, the administrator can save the modifications. When the administrator saves the modification, the administrator is provided with an option to select another store at 1402. If that is the case, then the entire flow shown in FIGS. 14*a* and 14*b* is repeated again. The ability to customize at a component level rather than at a broader level, i.e., only theme, provides the administrator with flexibility to design a store interface. Furthermore, the use of hierarchical and rule capabilities allow the administrator to set default components across all or some pages of the store.

As discussed, one embodiment is an interactive store design interface based system with a graphical user interface that allows the administrator to select and modify sites of a portal. The graphical user interface provides the administrator with a shell selection module, a menu selection module, a header selection module, a footer selection module, a UI content selection module, and a theme selection module of the site. The graphical user interface also provides seamless transition from one module to another, as well as interactive functionalities to change the UI content of one or more pages of the site.

As a result, the administrator of the portal can design and deploy a store without downtime and increase revenue of a company with maximum presence through an interactive store designer. Because the designer is easy to use and requires a technical understanding, maintenance cost is reduced as a software specialist is no longer needed to modify code. The administrator of the portal can also customize one or more sites of the portal remotely through remote logon.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon to configure an online shopping portal comprising a plurality of sites that, when executed by a processor, cause the processor to configure the online shopping portal, the configuring comprising:

storing, in a memory, an online shopping portal including at least three hierarchical web sites, each web site having a plurality of pages, the plurality of pages including at least one catalog page and at least one product details page for a product, the product details page including a product description and a product price for a single product, wherein, a first of the hierarchical websites comprises a parent configuration inherited at least in part by a second and third of the hierarchical websites, and the second hierarchical website comprises a parent of the third hierarchical website, wherein configurations specific to the second hierarchical website are inherited at least in part by the third hierarchical website;

receiving a request to configure a site of the online shopping portal;

providing a user interface (UI) shell that corresponds to the site, the UI shell including a component palette and a working area;

receiving a selection of a page from the plurality of pages of the site to configure;

providing UI content, based on a set of rules that determine business or functional relevance of UI content with respect to the selected page, within a plurality of UI content widgets in the component palette, the plurality of UI content widgets including one or more of:

a my profile UI content widget that includes at least one of a user name, address, and phone number, a compare UI content widget that includes information for a user to compare two or more products listed on a catalog page, a promotions UI content widget that includes hot offers related to a currently illustrated product on a product details page, and a shopping cart UI content widget that includes one or more products to be purchased by the user, a quantity of each product, a price of each product, and a total cost of the products;

providing a plurality of placeholders in the working area, the placeholders configured to hold UI content in certain areas of the selected page;

receiving a drag-and-drop selection of one of the plurality of UI content widgets from the component palette to a placeholder from the working area;

displaying the selected UI content widget in the selected placeholder; and receiving a first modification for the first hierarchical website that is reflected in the second and third hierarchical websites and a second modification for the second hierarchical website that is reflected in the third hierarchical website.

2. The non-transitory computer readable medium of claim 1, further comprising providing UI content, currently displayed on the selected page, in the working area.

3. The non-transitory computer readable medium of claim 1, wherein, when the catalog page is selected as the page of the site to configure, the UI content further comprises at least one of: a narrow by UI content, a compare UI content, or a price range UI content.

4. The non-transitory computer readable medium of claim 1, wherein, when the order details page is selected as the page of the site to configure, the UI content comprises at least one of: a shipping details UI content or a service request UI content.

5. The non-transitory computer readable medium of claim 1, wherein, when the product details page is selected as the page of the site to configure, the UI content comprises at least one of: a related item UI content, or a hot offers UI content.

6. The non-transitory computer readable medium of claim 1, wherein, when all pages is selected as the page of the site to configure, the UI content comprises at least one of: a user profile UI content or a contact us UI content.

7. The non-transitory computer readable medium of claim 1, further comprising receiving a selection of a menu type, a header, or a footer.

8. The non-transitory computer readable medium of claim 7, wherein the menu type comprises a set of menu types that includes at least one of:
a vertical menu type or a horizontal menu type, and wherein a new menu type is added to the set of menu types.

9. The non-transitory computer readable medium of claim 7, wherein the header comprises a set of headers that includes at least one of:
a two level menu header or three level menu header, and wherein a new header is added to the set of headers.

10. The non-transitory computer readable medium of claim 7, wherein the footer comprises a set of footers that include at least one of:
a copyright message or copyright and menu links, and wherein a new footer is added to the set of footers.

11. The non-transitory computer readable medium of claim 7, further comprising:
receiving a selection of a site theme from a set of themes including at least two of a seasonal theme, a holiday theme, a geographic theme or a color theme; and
adding a new theme to the set of themes.

12. The non-transitory computer readable medium of claim 7, wherein, when a new site is created, the new site inherits the design of the first hierarchical website.

13. The non-transitory computer readable medium of claim 1, further comprising providing a deletion mechanism configured to remove the currently displayed UI content from the selected page.

14. The non-transitory computer readable medium of claim 1, wherein at least one of the first modification or the second modification comprises a drag-and-drop selection of one of the plurality of UI content widgets from the component palette to a placeholder.

15. An apparatus to configure an online shopping portal comprising a plurality of sites, the apparatus comprising:
a non-transitory memory storing an online shopping portal including at least three hierarchical web sites, each web site having a plurality of pages, the plurality of pages including at least one catalog page and at least one product details page for a product, the product details page including a product description and a product price for a single product, wherein,
a first of the hierarchical websites comprises a parent configuration inherited at least in part by a second and third of the hierarchical websites, and
the second hierarchical website comprises a parent of the third hierarchical website, wherein configurations specific to the second hierarchical website are inherited at least in part by the third hierarchical website; and
a processor, coupled to the memory, configured to:
receive a request to configure a site of the online shopping portal;
provide a user interface (UI) shell that corresponds to the site, the UI shell including a component palette and a working area;
receive a selection of a page from the plurality of pages of the site to configure;
provide UI content, based on a set of rules that determine business or functional relevance of UI content with respect to the selected page, within a plurality of UI content widgets in the component palette, the plurality of UI content widgets including:
a my profile UI content widget that includes a user name, address, and phone number,
a compare UI content widget that includes information for a user to compare two or more products listed on a catalog page,
a promotions UI content widget that includes hot offers related to a currently illustrated product on a product details page, and
wherein, a shopping cart UI content widget that includes one or more products to be purchased by the user, a quantity of each product, a price of each product, and a total cost of the products;
provide a plurality of placeholders in the working area, the placeholders configured to hold UI content in certain areas of the selected page;
receive a drag-and-drop selection of one of the plurality of UI content widgets from the component palette to a placeholder from the working area; and
display the selected UI content widget in the selected placeholder; and
receive a first modification for the first hierarchical website that is reflected in the second and third hierarchical websites and a second modification for the second hierarchical website that is reflected in the third hierarchical website.

16. The apparatus of claim 15, further comprising providing UI content, currently displayed on the selected page, in the working area.

17. The apparatus of claim 15, wherein the page that is being selected comprises one of: all pages, a catalog page, an order details page, or a product details page.

18. A computer implemented method of configuring an online shopping portal comprising a plurality of sites, the method comprising:
storing, in a memory, an online shopping portal including at least three hierarchical web sites, each web site having a plurality of pages, the plurality of pages including at least one catalog page and at least one product details page for a product, the product details page including a product description and a product price for a single product, wherein,
- a first of the hierarchical websites comprises a parent configuration inherited at least in part by a second and third of the hierarchical websites, and
- the second hierarchical website comprises a parent of the third hierarchical website, wherein configurations specific to the second hierarchical website are inherited at least in part by the third hierarchical website;

receiving a request to configure a site of the online shopping portal;

providing a user interface (UI) shell that corresponds to the site, the UI shell including a component palette and a working area;

receiving a selection of a page from the plurality of pages of the site to configure;

providing UI content, based on a set of rules that determine business or functional relevance of UI content with respect to the selected page, within a plurality of UI content widgets in the component palette, the plurality of UI content widgets including:

a my profile UI content widget that includes a user name, address, and phone number, a compare UI content widget that includes information for a user to compare two or more products listed on a catalog page, a promotions UI content widget that includes hot offers related to a currently illustrated product on a product details page, and wherein, a shopping cart UI content widget that includes one or more products to be purchased by the user, a quantity of each product, a price of each product, and a total cost of the products;

providing a plurality of placeholders in the working area, the placeholders configured to hold UI content in certain areas of the selected page;

receiving a drag-and-drop selection of one of the plurality of UI content widgets from the component palette to a placeholder from the working area;

displaying the selected UI content widget in the selected placeholder; and receiving a first modification for the first hierarchical website that is reflected in the second and third hierarchical websites and a second modification for the second hierarchical website that is reflected in the third hierarchical website.

19. The computer implemented method of claim 18, further comprising providing UI content, currently displayed on the selected page, in the working area.

20. The computer implemented method claim 18, further comprising:
- providing, by a default mechanism, at least one UI content that is applicable to all pages of the site when all pages is selected from a drop down; and
- applying the at least one UI content to all pages of the site when a user selected the at least one UI content.

* * * * *

UNITED STATES PATENT AND TRADEMARK OFFICE
CERTIFICATE OF CORRECTION

PATENT NO. : 10,909,545 B2  
APPLICATION NO. : 12/508994  
DATED : February 2, 2021  
INVENTOR(S) : Gupta et al.

Page 1 of 1

It is certified that error appears in the above-identified patent and that said Letters Patent is hereby corrected as shown below:

In the Claims

In Column 14, Line 23, in Claim 20, after "method" insert -- of --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*